United States Patent Office 3,090,788
Patented May 21, 1963

3,090,788
SUBSTITUTED ISOXAZOLECARBOXAMIDE COMPOUNDS
Max Hoffer, Nutley, N.J., assignor to Hoffmann-La Roche Inc., Nutley, N.J., a corporation of New Jersey
No Drawing. Filed Nov. 2, 1960, Ser. No. 66,697
10 Claims. (Cl. 260—299)

This invention relates to novel N-(3-mercuripropyl)-isoxazolecarboxamide compounds, methods of preparing them and novel N-allylisoxazole-carboxamide intermediates utilized in their preparation.

The novel N-(3-mercuripropyl)-isoxazolecarboxamide compounds are of the structural formula

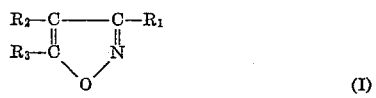

(I)

wherein one of $R_1$, $R_2$ and $R_3$ is a radical of the structural formula

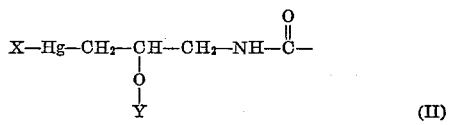

(II)

wherein X is a therapeutically acceptable anion and Y is lower alkyl, and the other two of $R_1$, $R_2$ and $R_3$ are chosen from the group consisting of lower alkyl and hydrogen.

Illustrative of X are numerous therapeutically acceptable anions known to the pharmaceutical art, e.g. halogen, acetoxy, thiocyano, sulfate, nitrate and others. As to the symbols R and Y, the lower alkyl group in each instance refers to such straight chain and branched chain aliphatic hydrocarbon radicals as methyl, ethyl, propyl, isopropyl and the like.

Representative compounds falling within the Formula I are N-(3-chloromercuri-2-methoxypropyl)-5-methyl-3-isoxazolecarboxamide, N-(3-chloromercuri-2-methoxypropyl)-3-methyl-5-isoxazolecarboxamide, N-(3-chloromercuri-2-methoxy propyl)-3,5-dimethyl-4-isoxazolecarboxamide, N-(3-chloromercuri-2-ethoxypropyl)-5-methyl-3-isoxazolecarboxamide, N-(3-thiocyanomercuri-2-methoxypropyl)-3-methyl-5-isoxazolecarboxamide and N-(3-acetoxymercuri-2-methoxypropyl)-3-methyl-5-isoxazolecarboxamide.

In naming the isoxazole derivatives of this invention the numbering of the isoxazole ring recommended by the Ring Index (Reinhold Publishing Corporation, New York, New York, 1960) has been used. This numbering is that set forth in System Number 118 of the Ring Index.

The novel compounds of the invention of Formula I are useful therapeutic agents and are particularly useful for their antibacterial properties. More specifically they are useful in the treatment of urinary infections, i.e. to combat the bacteria causing the infection. These compounds can be administered in conventional therapeutic dosage forms and they may be administered internally.

The compounds of the invention represented by Formula I can be obtained by procedures known to the art, or, for instance by reacting an acid chloride of an isoxazolecarboxylic acid with allylamine to obtain an N-allyl-isoxazolecarboxamide. This latter compound can then be reacted with mercuric acetate in the presence of a lower alkanol to yield an N-(3-acetoxymercuri-2-lower alkoxypropyl)-isoxazolecarboxamide. If a different therapeutically acceptable anion besides acetoxy is desired, then the acetoxy group can be exchanged for other anionic groups (represented by X in Formula I above) by reacting the N-(3-acetoxymercuri-2-lower alkoxypropyl)-isoxazolecarboxamide with a suitable metal salt, for instance a metal salt of an acid containing the desired anion, e.g. sodium chloride, silver nitrate, potassium thiocyanate and the like. It is not necessary to isolate the N-(3-acetoxymercuri-2-lower alkoxypropyl)-isoxazole-carboxamide from the reaction mixture and, if desired, the metal salt can be added directly thereto. In the alternative, the N-(3-acetoxymercuri-2-lower alkoxypropyl)-isoxazolecarboxamide can be isolated and then reacted with the metal salt. The halogenomercuri compounds so obtained can be further reacted with a therapeutically acceptable anion-containing metal salt; preferably a silver salt, e.g. silver acetate or silver nitrate; to obtain a compound containing any desired anion attached to the mercury.

The N-allyl-isoxazolecarboxamides formed as intermediates in the above-outlined procedure are novel compounds which are of the following structural formula:

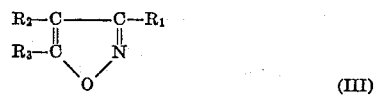

(III)

wherein one of $R_1$, $R_2$ and $R_3$ is a radical of the structural formula

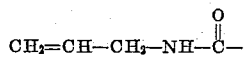

and the other two of $R_1$, $R_2$ and $R_3$ are chosen from the group consisting of lower alkyl and hydrogen. The lower alkyl group has the meaning given above, i.e. such straight chain and branched chain aliphatic hydrocarbon radicals as methyl, ethyl, propyl, isopropyl and the like.

Representative compounds falling within the Formula III are N-allyl-5-methyl-3-isoxazolecarboxamide, N-allyl-3-methyl-5-isoxazolecarboxamide and N-allyl-3,5-dimethyl-4-isoxazolecarboxamide.

The N-allyl-isoxazolecarboxamides of the invention are, as set forth above, useful intermediates in the preparation of therapeutically valuable N-(3-mercuri-2-lower alkoxypropyl)-isoxazolecarboxamides.

Although the general outline for the preparation of the novel compounds is shown above, the following examples disclose fully specific methods of preparation of compounds falling within the invention. It will be understood, however, that these examples are merely illustrative of the compounds and processes of the invention. The examples are not to be taken as limitative of the invention, either as to the compounds or methods specifically disclosed. All temperatures are in degrees centigrade.

Example 1

To a stirred and cooled mixture of 11.4 g. allylamine and 70 ml. 3 N aqueous sodium hydroxide solution, there were added in small portions 29.1 g. 3-methyl-isoxazole-5-carboxylic acid chloride. After 5 hours, the formed crystals were collected by filtration. Recrystallized from heptane, the resultant N-allyl-3-methyl-isoxazole-5-carboxamide melted at 77–78°.

8.3 g. of this material were dissolved together with 16 g. mercuric acetate in 60 ml. methanol and the solution refluxed for 6 hours on a steam bath. It was cleared by filtration over cellite and a solution of 3 g. sodium chloride in 40 ml. water was added. After 24 hours, N-(3-chloromercuri-2-methoxypropyl)-3-methyl-5-isoxazolecarboxamide had crystallized. Recrystallized from alcohol, it melted at 149°.

Example 2

N-allyl-5-methyl-isoxazole-3-carboxamide was prepared like its isomer as described in Example 1. The compound, recrystallized from heptane, melted at 61°.

8.3 g. of this material were heated with 16 g. mercuric acetate in 60 ml. methanol under reflux for 6 hours. The cleared solution after the addition of 3 g. sodium chloride in 40 ml. water gave N-(3-chloromercuri-2-methoxypropyl)-5-methyl-3-isoxazole carboxamide, M.P.=148°.

Example 3

16.6 g. N-allyl-5-methyl-isoxazole-3-carboxamide, 32 g. mercuric acetate and 100 ml. ethanol were refluxed on a steam bath for 6 hours. After allowing to cool, a solution of 6 g. sodium chloride in 200 ml. water were added. The formed crystals were collected by filtration after 24 hours. After drying they were dissolved in 150 ml. hot toluene, the solution filtered hot from undissolved impurities. Upon cooling, the product partly crystallized. The toluene was evaporated in a vacuum and the residue recrystallized from alcohol. N-(3-chloromercuri-2-ethoxypropyl)-5-methyl-3-isoxazolecarboxamide thus obtained melted at 141°.

Example 4

To a suspension of 43.3 g. N-(3-chloromercuri-2-methoxy-propyl)-5-methyl-3-isoxazolecarboxamide in 300 ml. water at 70° there was added under stirring 16.7 g. silver acetate. The solution was filtered from silver chloride and evaporated in a vacuum. The residual syrup solidified after some time and the material was recrystallized from isopropanol. N-(3-acetoxymercuri-2-methoxypropyl)-5-methyl-3-isoxazolecarboxamide thus obtained melted at 98°. It is very soluble in water.

Example 5

16.6 g. N-allyl-5-methyl-isoxazole-3-carboxamide, 32 g. mercuric acetate, 120 ml. methanol were refluxed for 6 hours. The solution was cleared by filtration over cellite and evaporated in a vacuum to a syrup. The syrup was dissolved in 75 ml. isopropanol and the solution seeded with some crystals of N-(3-acetoxymercuri-2-methoxypropyl)-5-methyl-3-isoxazole carboxamide as obtained in Example 4. It crystallized rapidly. The crystals were collected by filtration and were identical with the material obtained in Example 4.

Example 6

22.25 g. of the product of Example 4 or 5 were dissolved in 100 ml. water and a solution of 5 g. potassium thiocyanate in 20 ml. water were added. The precipitate after having become crystalline was filtered by suction and the material recrystallized from water, or isopropanol. The white crystals of N-(3-thiocyanomercuri-2-methoxypropyl)-5-methyl-3-isoxazole carboxamide melt at 128°.

Example 7

To a stirred mixture of 11.4 g. allylamine and 70 ml. 3 N NaOH and 100 ml. heptane there are added 31.9 g. 3,5-dimethyl-4-isoxazole-carboxylic acid chloride. After 12 hours stirring the crystals formed were filtered by suction, and washed with water. N-allyl 3,5-dimethylisoxazole-4-carboxiamide melts at 71–72°.

18 g. of this material, 32.2 g. mercuric acetate and 120 ml. methanol were refluxed for 6 hours. To the solution was added 6 g. sodium chloride dissolved in 25 ml. water. The product, N-(3-chloromercuri-2-methoxypropyl)-3,5-dimethyl isoxazole-4-carboxamide, crystallized rapidly. The crystals were collected by filtration and recrystallized from alcohol, and had a melting point of 159–160°.

I claim:

1. A compound of the formula

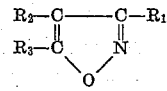

wherein one of $R_1$, $R_2$ and $R_3$ is a radical of the formula

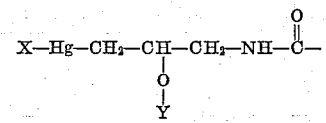

wherein X is a therapeutically acceptable anion and Y is lower alkyl, and the other two of $R_1$, $R_2$ and $R_3$ are chosen from the group consisting of lower alkyl and hydrogen.

2. A compound of the formula

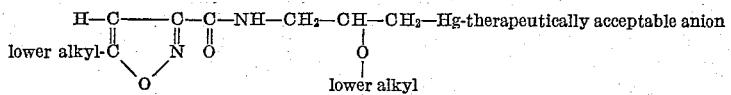

3. A compound of the formula

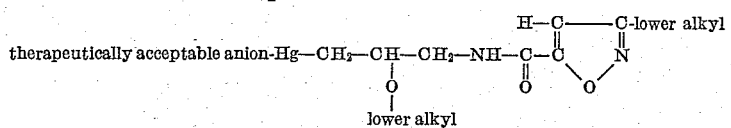

4. A compound of the formula

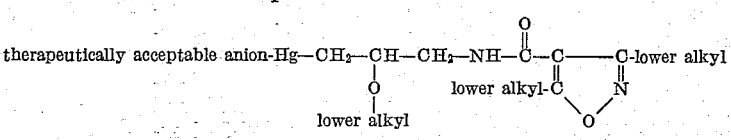

5. N - (3-chloromercuri-2-methoxypropyl)-5-methyl-3-isoxazolecarboxamide.

6. N - (3-chloromercuri-2-methoxypropyl)-3-methyl-5-isoxazolecarboxamide.

7. N-(3-chloromercuri-2-methoxypropyl)-3,5-dimethyl-4-isoxazolecarboxamide.

8. N - (3 - chloromercuri-2-ethoxypropyl)-5-methyl-3-isoxazolecarboxamide.

9. N-(3-thiocyanomercuri-2-methoxypropyl)-3-methyl-5-isoxazolecarboxamide.

10. N - (3-acetoxymercuri-2-methoxypropyl)-3-methyl-5-isoxazolecarboxamide.

References Cited in the file of this patent

UNITED STATES PATENTS

| | | |
|---|---|---|
| 2,115,681 | Hoffer | Apr. 26, 1938 |
| 2,672,472 | Yale | Mar. 16, 1954 |
| 2,876,230 | Folkers et al. | Mar. 3, 1959 |